(12) United States Patent
Cao et al.

(10) Patent No.: US 7,734,707 B2
(45) Date of Patent: Jun. 8, 2010

(54) DON'T DISTURB SERVICE MANAGEMENT SYSTEM AND IMPLEMENTATION THEREOF

(75) Inventors: Zhongmin Cao, Beijing (CN); Suoran Wang, Beijing (CN); Juan Yun, Beijing (CN); Ping Wang, Beijing (CN)

(73) Assignee: Beijing Watch Data System Co., Ltd., Beijing (CN)

( * ) Notice: Subject to any disclaimer, the term of this patent is extended or adjusted under 35 U.S.C. 154(b) by 399 days.

(21) Appl. No.: 11/915,139

(22) PCT Filed: Aug. 1, 2006

(86) PCT No.: PCT/CN2006/001919

§ 371 (c)(1),
(2), (4) Date: Nov. 20, 2007

(87) PCT Pub. No.: WO2007/036118

PCT Pub. Date: Apr. 5, 2007

(65) Prior Publication Data

US 2008/0208955 A1    Aug. 28, 2008

(30) Foreign Application Priority Data

Sep. 29, 2005  (CN)  .................. 2005 1 0108132

(51) Int. Cl.
*G06F 15/16* (2006.01)
(52) U.S. Cl. ..................................................... 709/206
(58) Field of Classification Search ................. 709/246, 709/229, 223, 245, 220, 217, 206, 204, 203; 379/93.15, 93.01, 88.17, 222, 220.01; 370/428, 370/401, 352, 342, 331, 329, 229
See application file for complete search history.

(56) References Cited

U.S. PATENT DOCUMENTS 7,529,817 B2 * 5/2009 Kim .......................... 709/220
2006/0194595 A1 * 8/2006 Myllynen et al. ........... 455/466

FOREIGN PATENT DOCUMENTS

CN            1345154         4/2002

(Continued)

OTHER PUBLICATIONS

International Search Report for PCT Application No. CN2006/001919, dated Nov. 30, 2006, 3 pages.

*Primary Examiner*—Wing F Chan
*Assistant Examiner*—Charles Murphy
(74) *Attorney, Agent, or Firm*—Knobee Martens Olson & Bear LLP

(57) ABSTRACT

The present invention discloses a Don't Disturb Service management system and implementation thereof. The system includes a Don't Disturb Service management center and a subscriber identify module with the Don't Disturb function. In the Don't Disturb Service management center, a content management device records the content of messages and sets attributes for each recorded message; a downlink instruction sending and processing device selects the corresponding message from the content management device according to the service identifier included in the service request up-sent by the subscriber identify module, and constructs the data short messages to be sent, with the content and attribute of the selected message and its attributes in the predetermined format. In the subscriber identify module with Don't Disturb function, a downlink instruction receiving and processing device stores the complete information included in the received data messages into the designated storage file; the interface output device is used to send the information belonging to a category to a user according to the attributes of message stored in said storage file when the user finds out said category.

16 Claims, 7 Drawing Sheets

FOREIGN PATENT DOCUMENTS

| | | | |
|---|---|---|---|
| CN | 2514594 Y | 10/2002 |
| CN | 1529524 A | 9/2004 |
| CN | 1585512 A | 2/2005 |

* cited by examiner

| First Grade | Second Grade | Third Grade | Fourth Grade | Fifth Grades | Sixth Grades | Seventh Grades | Eighth Grades | Function code |
|---|---|---|---|---|---|---|---|---|
| Brand name | Column 1 | On demand | | | | | | +DBa: the service code sent to SPA |
| | | customize/ countermand | | | | | | +WDZa/+WQXa: the service code sent to SPA |
| | | Message browse | 【Message list】 | Message content | Favorites | | | |
| | | | | | Reply | | | |
| | | | | | Forward | 【Name list】 | Send | |
| | Column 2 | 【Message list】 | Message content | Favorites | | | | |
| | | | | Reply | | | | |
| | | | | Forward | 【Name list】 | Send | | |
| | ... | | | | | | | |
| | Column n | | | | | | | |
| Favorites | 【Message list】 | Favorites | | | | | | |
| | | Forward | 【Name list】 | Send | | | | |
| | | Edit | Store | | | | | |
| | | Delete | | | | | | |

Figure 9

DON'T DISTURB SERVICE MANAGEMENT SYSTEM AND IMPLEMENTATION THEREOF

TECHNICAL FIELD

The present invention relates to a digital mobile communication system, and more specifically, to a Don't Disturb Service management system in the digital mobile communication system and implementation thereof.

BACKGROUND OF THE INVENTION

Generally, information interactions between the common subscriber identify module (SIM) and the value-added system are via short message channel, and the received short messages are stored in the special short message file, such as 6F3C file, in the subscriber identify module, and meanwhile, there is notification of the arrival of new message in all mobile terminals.

According to GSM03.40 specification, if the short message head is removed from a short message, the information that really is sent is only 140 bytes, namely 70 characters. Therefore, if the length of a message is larger than 70 characters, the sender has to split it into several short messages and sends them out, meanwhile, if the receiver wants to read complete content of the message, he/she should read the several split short messages one by one.

Additionally, according to specifications of GSM11.11 and GSM11.14, the storage space for short messages in the SIM guarantees at most 255 short messages.

Content of the Invention

Direct against the above-mentioned disadvantages of implementing the value-added service by the common short message, the object of the present invention is to offer a system and method for using Don't Disturb mode to realize service application in the digital mobile communication system.

In one aspect, a Don't Disturb Service management system is offered. The system includes a Don't Disturb Service management center and a SIM having the Don't Disturb function. Wherein, the Don't Disturb Service management center includes a content management device recording the content of messages and setting attributes for each recorded message; A downlink instruction sending and processing device selecting the corresponding message from the content message device according to the service identifier included in the service request up-sent by the SIM, and construct the data short messages, which are to be sent to said SIM, with the content and attribute of the selected message and its attributes in the predetermined format. Wherein the SIM with Don't Disturb function includes the downlink instruction receiving and processing device for storing the complete information included in the received data messages into the designated storage file; The interface output device, which is used to send the information belonging to a category to a user according to the attributes of message stored in said storage file when the user find out said category.

The aforesaid content management device further includes the information identifier setting unit, which is used to set the information identifier, which is composed of the number of the column which the message content belongs to and the serial number of the message in the column, for each recorded message.

The aforesaid content management device further includes the sending time setting unit, which is used to set the sending time for each recorded message.

The aforesaid content management device still includes the storing time setting unit, which is used to set the storing time for each recorded message.

The aforesaid downlink instruction sending and processing device further includes the message selection unit, which is used to select the message to be down-sent from the content management device according to the service identifier included in the service request up-sent by the SIM.

The aforesaid downlink instruction sending and processing device further includes message splitting unit, which is used to split a message into several data short messages and mark the number of the data short messages for sending the said message and the number identifier into the corresponding head of data short message.

The aforesaid downlink instruction receiving and processing device further includes the message joint unit, which is used to joint the message in several split data short messages according to the identifier of the data short message head.

The aforesaid downlink instruction receiving and processing device further includes the message accept and reject determination unit, which is used to determine whether a message in received data short messages is stored to the designated storage file, and accept and reject according to the determination result.

In another aspect, an implementation method of the Don't Disturb service is offered. The method includes the following steps: The Don't Disturb Service management center records the message content and set the attributes for each recorded message; Select the corresponding message from the recorded message according to the service identifier included in the service request up-sent, and construct the data short messages with the content and attributes of the selected message in the predetermined format and send it; The SIM with Don't Disturb function receives the down-sent data messages and store the complete message included in the received data message into the designated storage file; Send the information belonging to a category to a user according to the attribute of message stored in said storage file when the user finds out said category.

Attributes of the aforesaid message include the information identifier, which is composed of the number of the column which the message content belongs to and the serial number of the message in the column, said category is divided according to the column and the serial number in the column.

Attributes of the aforesaid message still includes the sending time of the message.

Attributes of the aforesaid message still includes the storing time of the message.

The aforesaid predetermined format includes the following items: value of the command type, the number of messages and identifier, lifetime, title and content of each message.

The aforesaid complete information obtained from the short message is obtained by jointing at least one data short message.

The aforesaid complete information obtained from the short message is extracted from several messages which make up of a data short message.

The aforesaid storing the complete information to the designated storage file further includes: after store the complete information from the short message to the designated storage file, detect the message stored in the designated storage file and delete one message when found out of date.

For a message in the aforesaid obtained complete information, detect whether there is a message in the designated storage file with the same identifier as the message when the category of the message already exists in the SIM.

If there is a message in the designated storage file having the same identifier and the message has already out of date, then remove the overdue message, and if the spare storage space is not enough for said message, delete another overdue message.

If there is no a message with the same identifier in the designated storage file, then remove an overdue message, and if the spare storage space is not enough for said message, then a next overdue message.

For each message in the aforesaid obtained complete information, detect whether there is a message in the designated storage file with the same identifier as the message when the category of the message already exists in the SIM.

If there is no a message with the same identifier in the designated storage file, then delete the oldest messages one by one until the spare storage space is enough for the message.

The aforesaid designated storage file doesn't occupy the storage space for common short messages in the SIM.

The present invention, which modifies on the basis of the existing specification of the STK (SIM value-added service toolkit), has many advantages and improvements, and some of them will be listed in the following:

1) The Don't Disturb Service management center in the Don't Disturb Service management system applies data short message mode to the message sent by the SIM, therefore, there is no notification of new short message arrival after the mobile terminal receives the new message, similar promptings such as "new message".
2) The Don't Disturb SIM card processes the received data short messages, and joint several data short messages which belong to the content of the same message and store as a message, and sequential show to the user in the mobile terminal, in the form of tuning over pages, which is more convenient for the reading of user.
3) The size of the designated file (not 6F3C file) in the SIM, in which the message stored, can be defined according to the capacity of the SIM, and the file doesn't occupy the short message storage space of the module, therefore, the spare storage space in the SIM can be fully utilized.
4) The SIM sorts and manages the received new message according to the content. The content of message is shown to the user in the form of directory tree, which is convenient for the message lookup by users and improve the lookup speed.
5) The SIM applies the automatic renew mechanism of message, and only stores the predetermined number of messages or messages in data for the messages in the same column, and when there is no space for the receiving new message, a old message will be automatically deleted. Therefore, there is no trouble of manual management of the messages in the SIM.
6) The SIM card with Don't Disturb function coordinates with the Don't Disturb Service management center to define the interaction format of the messages and implement the service application.

BRIEF DESCRIPTION OF DRAWINGS

FIG. 9 illustrates a basic structure of the preferred STK menu.

DETAILED DESCRIPTION OF THE EMBODIMENTS

Don't Disturb Service message receiving and transmitting system is a new technology of the digital mobile communication system, which realizes the Don't Disturb receiving of the service short message through the coordination between the SIM with Don't Disturb function and the Don't Disturb Service message management center in the digital mobile terminal. This technology can be used for various value-added service applications of the mobile terminals, such as news information, the ups and downs of the stock market, weather prediction, fiction serial, cell phone, newspaper, and so on.

The term "Don't Disturb short message" used in the following description refers to Don't Disturb Service message, which uses the data short messages as the carrier and uses the SIM as the process unit, and sends a lot of routine messages, such as weather prediction, the ups and downs of the stock market, daily jokes, and so on, to the user, in the manner of Don't Disturb according to the subscribing condition. Wherein, the identifier module, typically SIM (Subscriber Identify Module) card used in the GSM (global system for mobile communications) mobile unit, UIM (user identify module) card used for the CDMA network of the China Uniform, PIM (PHS identify module) card in PHS (personal handy-phone system) network, and USIM card in UMTS (universal mobile telecommunication system). Before the technical scheme of the present invention is described in detail, the aforesaid "data short message" will be described briefly. "Data short message" is a special short message, compared with the common short message which we usually use, these short messages are directed to the identify module without any process after it is received by the mobile unit. Therefore, from the view of user, the short message seems to become transparent to the mobile unit, and it doesn't aware them when it receives short messages and therefore, no any prompting.

Figure 1:
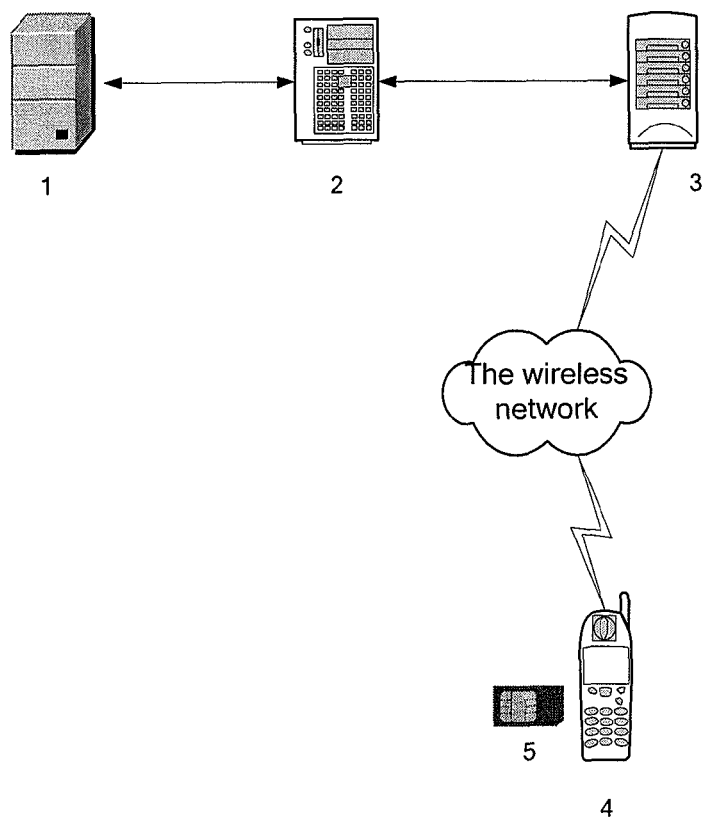
FIG. 1 is a simplified schematic diagram of the composition structure of the Don't Disturb Service management system in accordance with the present invention.

FIG. 1 is a simplified schematic diagram of the composition structure of the Don't Disturb Service management system in accordance with the present invention. As shown in FIG. 1, in this system, Don't Disturb Service management center 1 connects with the operator's short message gateway 2, which connects with the short message center 3, the mobile terminal 4 of the SIM card 5 supporting Don't Disturb Service connects the SIM card with the short message center 3 via the wireless network. The Disturb Service management center sends the information to the SIM in a manner of data short messages, the SIM processes the data short messages after receives it, and the processed messages are stored in the predetermined file. The specific procedure of this process will be described in the following. If the user wants to read the received message, the content is shown to the user in the mode of directory tree. In FIG. 1 and the following FIGS. 2 and 3, only the devices and units related to the description of the present invention are shown in the figures. The Don't Disturb Service management center 1 can be the special server or center offered in the mobile communication system, such as what is offered in the Don't Disturb Service management center, but can also be a part of the service management center unified by the operator.

Here, the data format for the Don't Disturb Service management center sending message to the user identify module is shown in Table 1:

TABLE 1

| Name | Description |
| --- | --- |
| Value of the command type | Different corresponding value for different function of the command |
| The number of the messages | A command can be made up of several messages and a message can also be made up of one command or several commands according to the length of the message |
| Message ID1 | Column ID + Message ID |
| Lifetime of message ID1 | The time of the message storing in the card |
| Attributes of message ID1 | |
| Title of message ID1 | |
| Content of message ID1 | |
| Message ID2 | Column ID + Message ID |
| Lifetime of message ID2 | |
| Attributes of message ID2 | |
| Title of message ID2 | |
| Content of message ID2 | |
| ... | |

In this embodiment, the total length of the above data format is 140 bytes.

Figure 2:
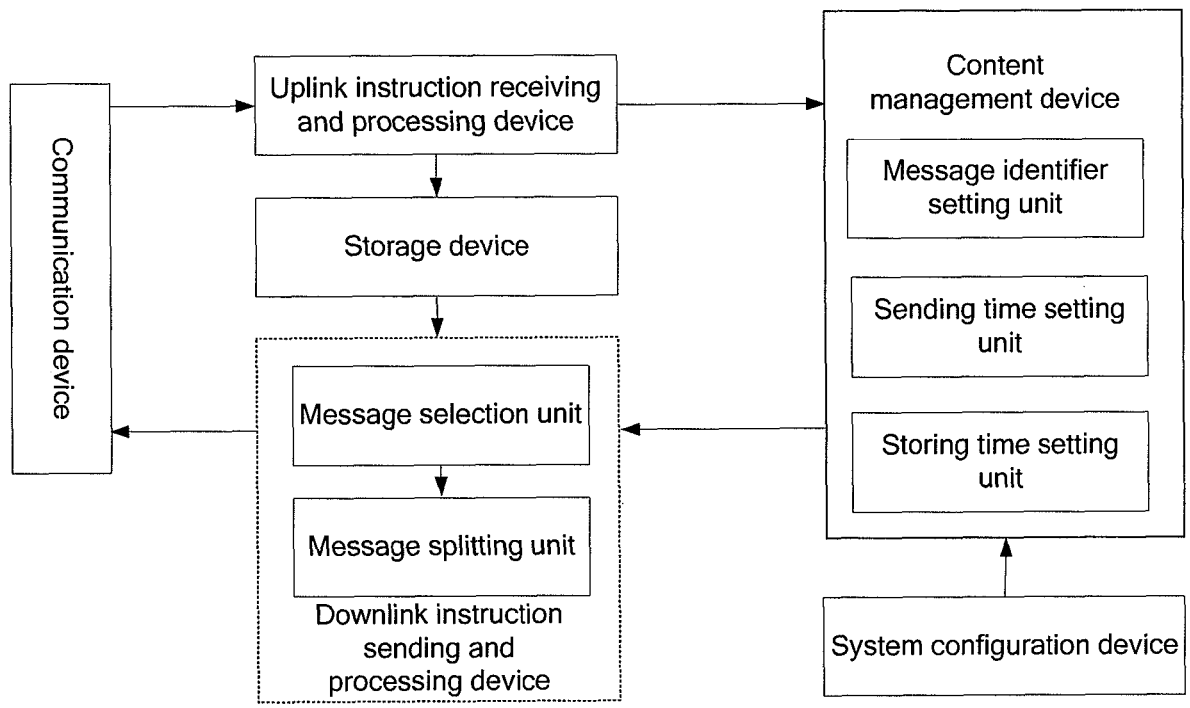
FIG. 2 is a simplified schematic diagram of the composition structure of the Don't Disturb Service management center in accordance with the present invention.

FIG. 2 is a simplified schematic diagram of the composition structure of the Don't Disturb Service management center in accordance with the present invention. The Don't Disturb Service management center mainly includes the communication device, the uplink instruction receiving and processing device, the downlink instruction receiving and processing device, storage device, content management device and system configuration device.

The communication device is mainly used to keep to the short message gateway protocols and receive the short message sent by the SIM with Don't Disturb function and send the data short messages to the SIM with this function through the connection built with the operator's short message gateway. In the downlink channel, the main operation performed when the communication device sending message to the user is, packing the sending message according to the communication protocol and sending it to the designated short message gateway; In the uplink channel, the main operation performed when the communication device receiving message from the message gateway is, unpacking the received message according to the communication protocol to get the message required for the sequential process.

The uplink instruction receiving and processing device obtains the received service request from the communication device, and the request is mainly used to obtain the user identifier of the SIM and the requested service identifier from the service request, and store these identifiers to the storage device.

The storage device is used to store the user identifier of the SIM and the requested service identifier correspondingly.

The downlink instruction receiving and processing device is mainly used to select the content to be sent from the content management device and prepare for sending the service process instruction to the SIM. When message suitable for the subscriber service request is selected from the content management device and to be sent, according to the format of Table 1, content is filled item by item, and then sent to the SIM with Don't Disturb Service function in the mode of data short messages via the communication device. If a message is too long to be sent via one data short message, the downlink instruction processing device splits the message and marks the number of the data short messages for sending the message and the number identifier into the corresponding data short message head.

Further, the downlink instruction sending and processing device includes the message selection unit, which is used to select the message to be sent down from the content management device according to the user identifier stored in the storage device and the corresponding service identifier; And the message splitting unit, which is used to split the message which can not be accommodated in one data short message into several data short messages, and mark the number of the data short messages for sending the message and the number identifier in the corresponding data short message head.

The content management device is mainly used to record the service message and manage the recorded message. In order to facilitate the SIM processing the message, when record the message, attributes such as message identifier, storage time, and sending time are set. If the Don't Disturb Service management system sorts the message content according to the column, identifier of each message is composed by the column number of the message and the message number in the column. The sending time represents the time for the server sending the message to the user. The storage time represents the time that the message can be stored in the SIM. This storage time is mainly used to automatically delete the message, therefore, relieving the trouble that the user should manually delete the message.

Further, the content management device includes the message identifier setting unit, which is used to set the message identifier for the recorded message, the message identifier is made up of the number of the column and the message number in the column; And the sending time setting unit, which is used to set the sending time for the recorded message so that the requested service message is sent to the SIM on time; And the storage time setting unit, which is used to set the storing time for the recorded message.

The system configuration device is mainly used to perform parameter configuration of the basic message of the whole service management system. The device offers a system parameter configuration interface for configuring the basic information of the system, including configuring the gateway address, so that the connection can be performed when receiving and sending the short message; configuring the communication port, to configure the communication port for receiving and sending short message; and configuring the resending times, to configure the resending times of the same message when the message can not be sent successfully one time; And configuring the user authority distribution. When configuring the user authority distribution, users are assigned with different priorities when they act differently in the Don't Disturb Service management system. For example, the user is assigned with message recording authority when he finishes the recording of the release message, but no other authorities; Some users check the message, so only the authority of message checking is assigned to them, therefore, they can not perform the other functions of the system; For the system administrator, he is assigned with all authorities so that he can manage the whole system.

Figure 3:
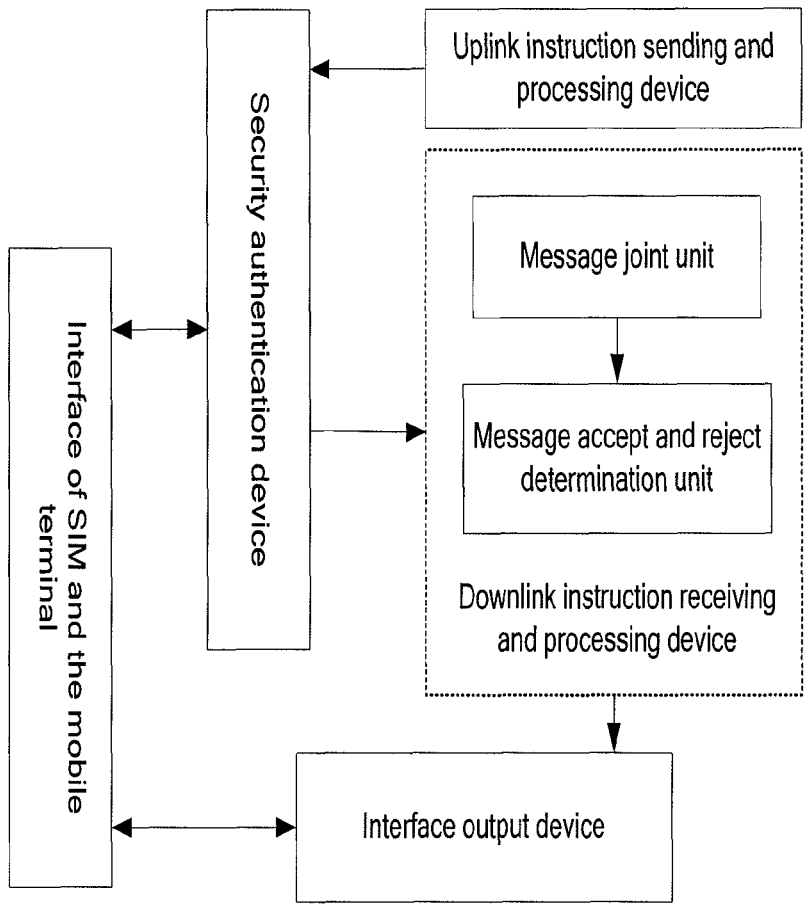
FIG. 3 is a simplified schematic diagram of the composition structure of the SIM with Don't Disturb function in accordance with the present invention.

FIG. 3 is a simplified schematic diagram of the composition structure of the SIM with Don't Disturb function in accordance with the present invention. The main improvement of the SIM with Don't Disturb function is to receive and process the messages of the service management system. As shown in the figure, it mainly includes the interface of SIM and the mobile terminal, the uplink instruction sending and processing device, the downlink instruction sending and processing device, interface output device and the security authentication device.

The interface of the SIM and mobile terminal mainly offers the interaction between the SIM and the mobile terminal, with this interface, the user operating interface offered by the interface output device is transmitted to the mobile terminal, and the command input by the user to the operating interface is transmitted to the SIM. The SIM offers the user the associated operation selective items according to the attributes of the user command and starts the interaction through the interface according to the selection of the user.

Figure 4:
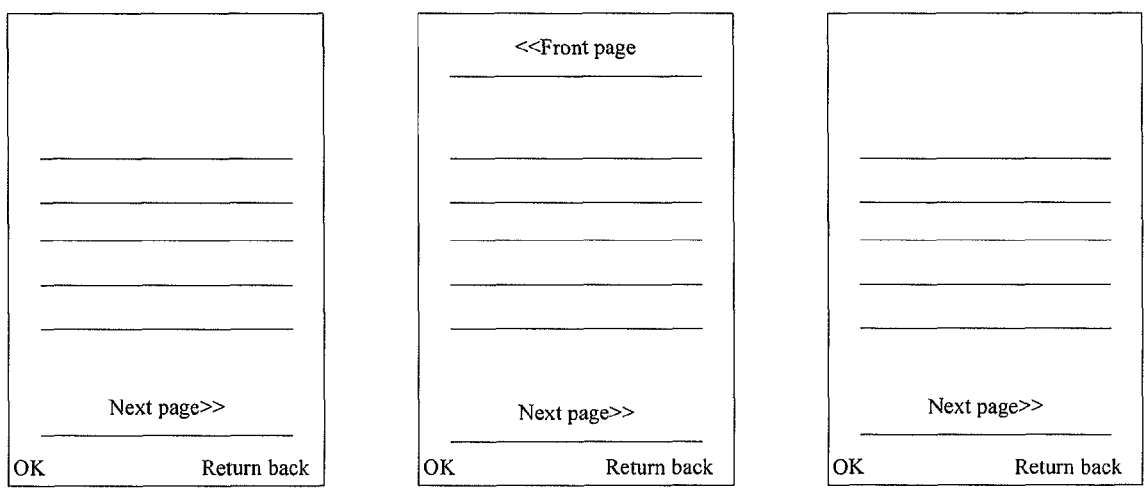
FIG. 4 is an example of the effect of the Don't Disturb Service message outputting in the form of tuning over pages in the mobile terminal.

The uplink instruction sending and processing device is mainly used to receive all instructions sent from the service management center through the interface of the SIM and the mobile terminal, and perform the corresponding operation according to the predetermined format of the instruction. Compared with the common SIM, when the SIM with Don't Disturb function interacts with the service management center, the downlink message applies the mode of data short message communication, and the SIM stores the received message to the predetermined file of the SIM. Additionally, according to agreement with the server, if a message consists of several data short messages, then the content of the received several data short messages is jointed to form a complete message and store in the file of the SIM. Therefore, when the user browses through the mobile terminal, he can browse in the mode of turning over pages, and this mode is shown in FIG. 4. If the SIM has no enough space for the message, it will delete the old messages according to the agreements.

Further, the downlink instruction receiving and processing device includes the message joint unit, which is used to joint the one message in several data short messages to recover the original complete message; The message accept and reject determination unit, which is used to determine whether a message in received data short messages is stored to the designated storage file, and accept and reject according to the determination result.

The interface output device is mainly used to send the information belonging to a category to a user according to the attributes of message stored in the designated storage file via the SIM-mobile terminal interface when the user finds out said category.

The security authentication module is used to process the security authentication of the uplink and downlink instructions at the side of the SIM to ensure that this message is only received by the designated identify module.

Figure 5:
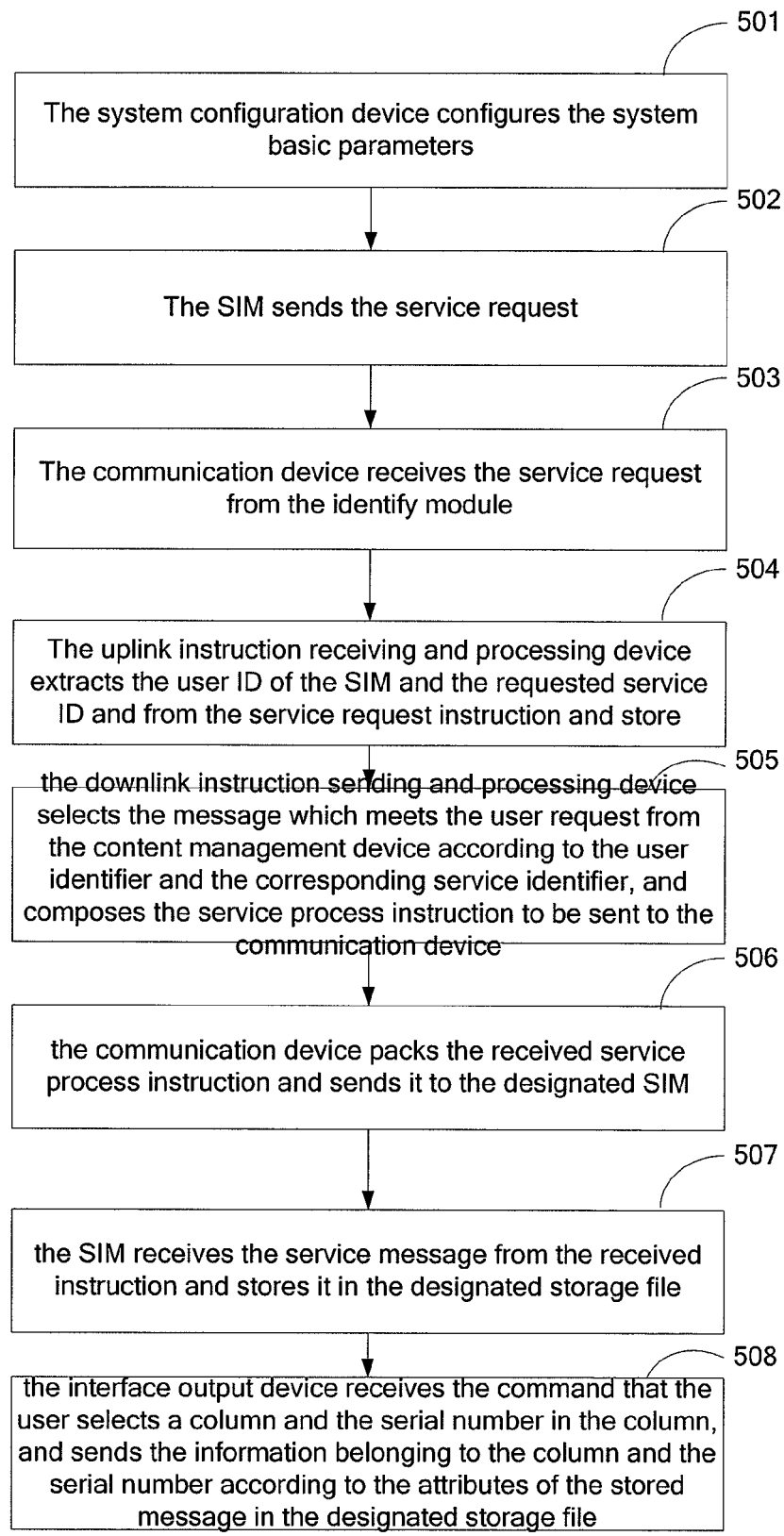
FIG. 5 illustrates the whole process flow of the Don't Disturb Service management system during the service implementation.

FIG. 5 shows the whole process flow of the Don't Disturb Service management system during the implementation of service.

Firstly in step 501, after the system configuration device in the Don't Disturb Service management center configures the basic parameters of the system, the Don't Disturb Service management center can work with the SIM with Don't Disturb function to process the associated service.

In step 502, the SIM can send service request to the Don't Disturb Service management center through the mobile terminal. In the request, it includes the user identifier and the service identifier which is used to identify different services.

In step 503, the communication device in the Don't Disturb Service management center receives the service request from the SIM with the Don't Disturb function, and sends the service request to the uplink instruction receiving and processing device.

In step 504, the uplink instruction receiving and processing device extracts the user identifier of the SIM and the identifier of the requested service from the received service request instruction, and corresponds and stores the two identifiers in the storage device.

In step 505, the downlink instruction sending and processing device selects the message which meets the user request from the message recorded by the content management device according to the user identifier stored in the storage device and the corresponding service identifier, and composes the service process instruction to be sent to the SIM with the message content and all attributes according to the determined format, such as the format shown in Table 1, and send to the communication device.

In step 506, the communication device packs the received service process instruction and sends it to the designated SIM.

In step 507, the SIM receives the service process instruction from the server through the interface of the SIM and the mobile terminal, the downlink instruction sending and processing device obtains the service message from the received instruction and stores it in the designated storage file. The specific procedure of storing message will be described with reference to the content shown in FIGS. 6 and 7.

In step 508, when the interface output device receives the command that the user selects a column and the serial number in the column through the interface of the SIM and the mobile terminal, it will outputs the information belonging to the column and the serial number according to the attributes of the stored message in the designated storage file.

It should be mentioned that if the service request sent by the SIM is a message-on-demand request, then the Don't Disturb Service management center will perform the above-mentioned whole process flow when sending the service message at each time. If the service request sent by the SIM is information customization request, the Don't Disturb Service management center will perform directly from step 505 when send the service message since then, and the downlink instruction sending and processing device periodically selects the message content which meets the request according to the sending period set in the process of the message sending at the first time.

Figure 6:
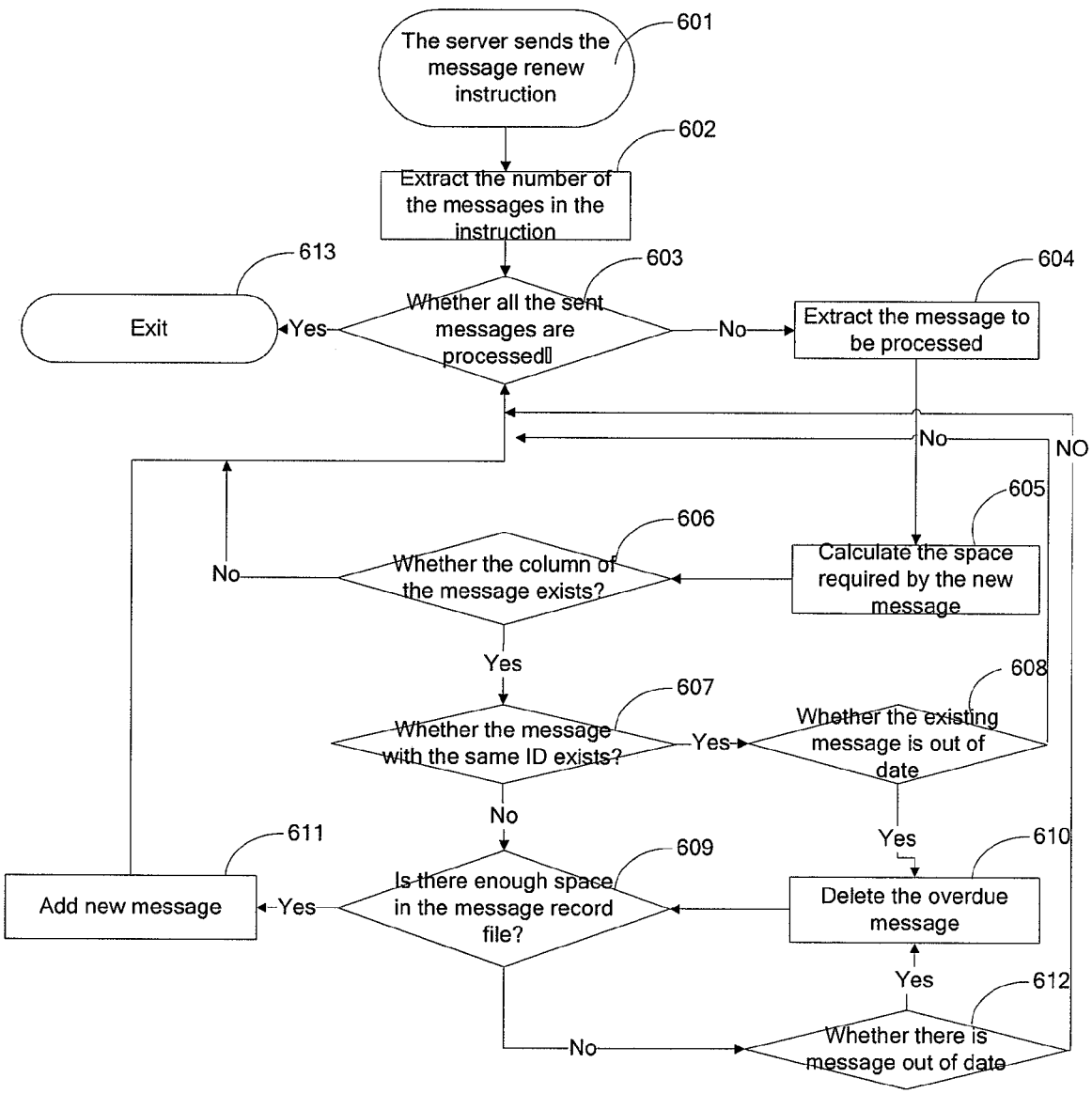
FIG. 6 illustrates the process of the SIM with Don't Disturb function storing the service message according to an embodiment of the present invention.

FIG. 6 illustrates the process of the SIM with Don't Disturb function storing the service message according to an embodiment of the present invention. After the SIM receives the message renew instruction, the message accept or reject determination unit in the downlink instruction sending and processing device in the module will selectively stores the message into the designated position according to the attributes of the new message and the capacity limitation of the SIM.

Firstly in step 601, the SIM receives the message renew instruction from the server. This instruction is sent in the mode of data short messages, and the type of the short message can be determined according to the instruction format of renewing message predetermined by the identify module and the server.

Since the messages have different length, each message may be composed of several data short messages or a data short message composes of several messages. Therefore, after a data short message of message renew is received, it should be extracted at step 602 firstly that how many items make up of the short message.

When the number of extracted messages is larger than 1, then each message is respectively and circularly processed in step 603 until all of them are processed.

In step 604, when each message is being processed, the message identifier should be offered at first. The message identifier is the serial number assigned by the server, which is mainly used to number each message and with which to facilitate the massage process.

In step 605, the space in the SIM required by the message is calculated.

In step 606, according to the message identifier, check whether there exists column which the message belongs to in the SIM or not. This identify module can store the message received from the server to the designated file of the SIM, and manage different message according to the column. If a message consists of several data short messages, the several received data short messages are jointed to form a complete message. It's different from the operation to the common short message since common short messages are stored in the specific file, such as 6F3C file, in the SIM and there is no category and there is no joint process to the message.

In this step, if there doesn't exist the column which the message belongs to, then the message is dropped; If there does, then determine in step 607 whether the message identifier (ID) exists in the SIM or not.

If the message ID exists in the SIM, then in step 608, check if the identifier of the existed message is out of date or not. If it is not, then the newly sent message is dropped; if it is, then delete this message from the SIM in step 610.

If the message ID sent by the server is different from the existing message ID in the SIM, then in step 609, check if there is enough space in the SIM for the message. Different spaces are opened for storing service message according to different capacities of the SIMs; if there is enough space, the message is added in step 611; if there is not, then check in step 612 if there is overdue message. If there is no overdue message, then the message is dropped; and if there is, the overdue message is deleted in step 610.

Figure 7:
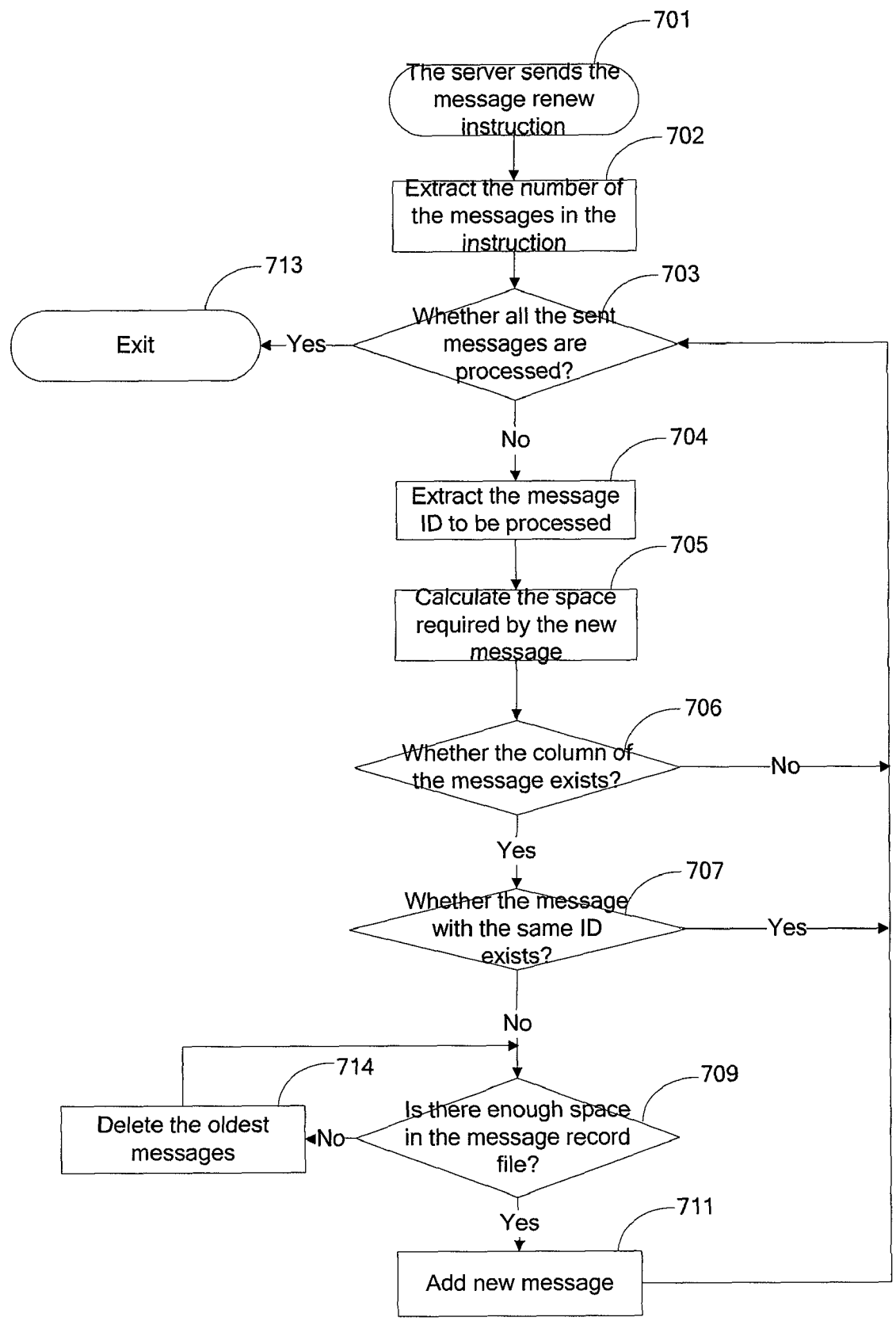
FIG. 7 illustrates the process of the SIM with Don't Disturb function storing the service message according to another embodiment of the present invention.

FIG. 7 illustrates the process of the SIM with Don't Disturb function storing the service message according to another embodiment of the present invention. For concision, the same steps in FIG. 7 as in FIG. 6 will not be described here. The difference between the embodiment of FIG. 7 and that is described in FIG. 6 is that the mechanisms to automatically renew the old message are different. If there is message having the same ID of the received message in the SIM in step 707, then NO matter whether the existing message with the same ID has been out of date or not, the currently received message is dropped. Additionally, when deleting the message, an oldest message is deleted in step 714, and there is no concept that whether the message is out of date or not.

Figure 8:
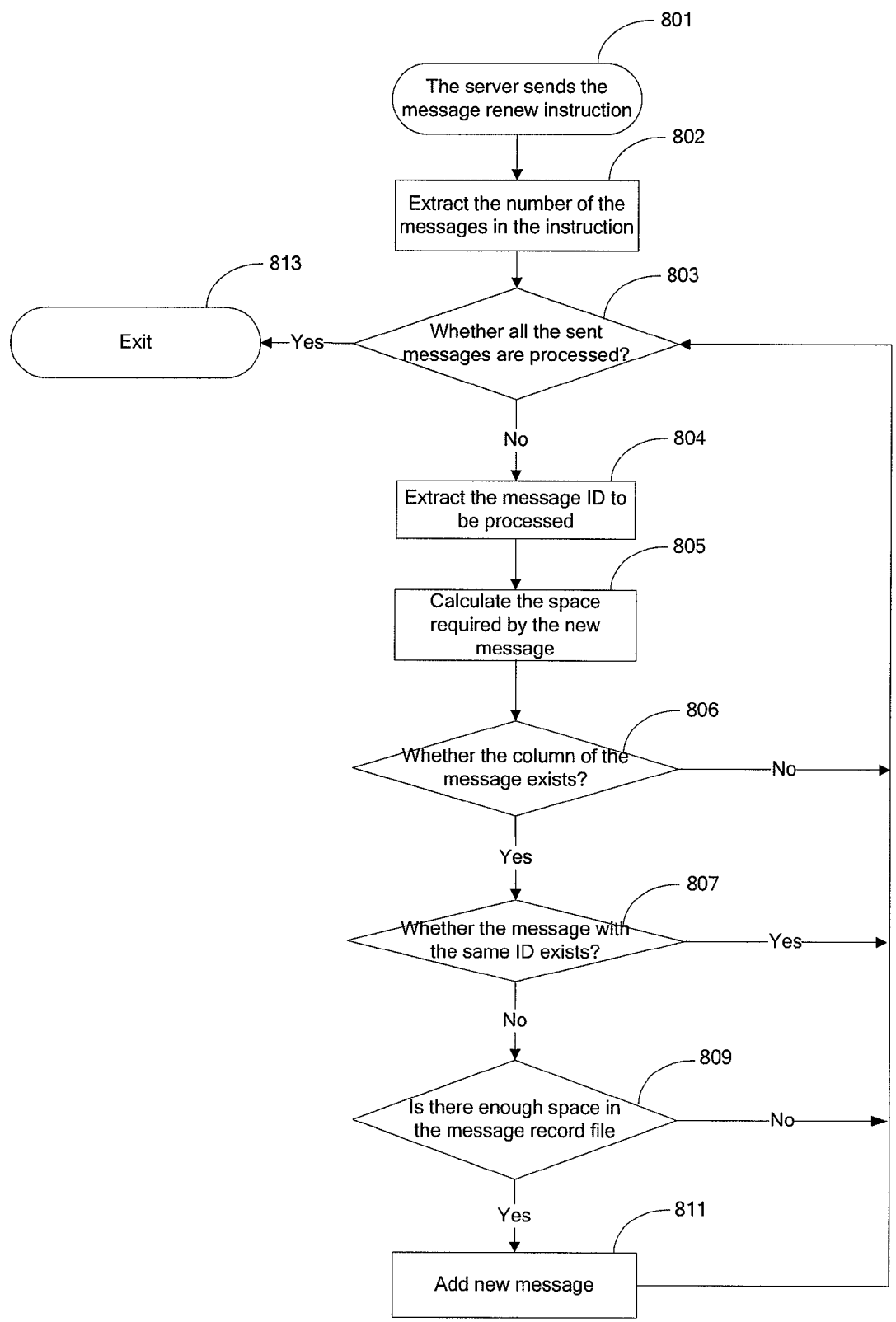
FIG. 8 illustrates the process of the SIM with Don't Disturb function storing the service message according to still another embodiment of the present invention.

Besides the two modes, the method for storing the service messages shown in FIG. 8 can be applied. For concision, the same steps in FIG. 8 as in FIG. 6 will not be described here. The difference between the embodiment of FIG. 8 and that described in FIG. 6 is that each message stored in the designated file of the SIM is detected and if overdue message is found, then it will be deleted. Therefore, if it is determined that there is no enough space for storing the new message in the designated message recording file in step 809, then the new message is dropped.

In the following, take the user customization service messages for instance, the effects of the information customization of no Don't Disturb mode and that of the Don't Disturb mode are compared. Here, the "STK menu service" is described firstly. It is various service functions offered to the user in the form of menu in the range of the STK (SIM card application toolkit) application specification of the SIM (subscriber identify module of GSM/GPRS network) card. A basic structure of the preferred STK menu is shown in FIG. 9.

For the user of the SIM with no Don't Disturb function: the subscriber sends the customization request code "DZ" or "+DZ" to SP (service provider) by performing the STK (SIM card application toolkit) menu or editing the ordinary short message to customize the service message. SP (service provider) determines whether the subscriber is the user of ordinary customization service through the received customization request code "DZ". After the user customization is determined, the subscribing content is sent periodically to the subscriber in the form of ordinary short message. After the subscriber receives the prompting of "receiving new short message" (voice or graphic representation), he will direct to the short message box to check and read. The customized message is not shown by grade through menu. If the received common short message does not include the content of the whole message, the subscriber should read the sequentially received short message one by one.

For the user of the SIM with Don't Disturb function: the subscriber customizes the service message by sending the customization request code "+WDZ" to SP or by performing the STK (SIM card application toolkit) menu. SP (service provider) determines whether the subscriber is the user of the SIM with Don't Disturb function through the received customization request code "+WDZ". After the user customization is determined, the subscribing content is sent periodically to the subscriber in the form of data short messages. The subscriber will not receive the tip of "receiving new short message" (voice or graphic representation), and can only find out if there is new message or not when browsing the corresponding column in the STK menu when every time the customization message is read. If the received ordinary short message is too long, the subscriber can read the received customized message by turning over pages.

It is evident that various modifications and changes may be made by those skilled in this area without departing from the spirit and scope of the present invention. Thus, the present invention is intended to embrace all such modifications and changes as may fall within the appended claims, and their equivalents.

The invention claimed is:

1. A Don't Disturb Service management system comprising:
   a Don't Disturb Service management center and a SIM with the Don't Disturb functionality;
   wherein said Don't Disturb Service management center comprises:
      a content management device recording the content of messages and editing attributes for each recorded message;
      a downlink instruction sending and processing device configured to select a corresponding message from the content management message device according to a service identifier included in a service request up-sent by the SIM, and construct data short messages to be sent to said SIM, with the content and attribute of the selected message and its attributes in a predetermined format; and
   wherein said content management device comprises:
      an information identifier setting unit configured to set an information identifier comprising the number of the column which the message content belongs to and the serial number of the message in the column, for each recorded message;

a sending time setting unit configured to set a sending time for each recorded message;

a storing time setting unit configured to set a storing time for each recorded message; and wherein said SIM with Don't Disturb functionality comprises:

a downlink instruction receiving and processing device for storing information included in received data messages into a designated storage file;

a interface output device, which is used to send the information belonging to a category to a user according to the attributes of message stored in said storage file when the user finds out said category.

2. The system of claim 1, wherein the downlink instruction sending and processing device further comprises a message selection unit configured to select a message to be down-sent from the content management device according to a service identifier included in a service request up-sent by the SIM.

3. The system of claim 1, wherein the downlink instruction sending and processing device further comprises a message splitting unit configured to split a message into several data short messages and mark the number of the data short messages for sending the message and the number identifier into the corresponding data short message head.

4. The system of claim 3, wherein the downlink instruction receiving and processing device further comprises a message joint unit configured to joint the message in several split data short messages according to the identifier of the data short message head.

5. The system of claim 1, wherein the downlink instruction receiving and processing device further comprises a message accept and reject determination unit configured to determine whether a message in received data short messages is stored to the designated storage file, and accept and reject according to the determination result.

6. A method of a Don't Disturb service comprising:

A) recording a message content and setting attributes for each recorded message at a Don't Disturb Service management center by a computing device, wherein the attributes of said message comprise a sending time of the message, a storing time of the message, and an information identifier comprising a number of a column which the message content belongs to and a serial number of the message in the column;

B) selecting a corresponding message from a recorded message sent by a computing device according to a service identifier included in a service request up-sent, and constructing data short messages sent by a computing device with the content and attributes of the selected message in a predetermined format and sending it;

C) receiving down-sent data messages and storing a complete message included in the received data message into a designated storage file at a SIM with Don't Disturb functionality;

d) sending the information belonging to a category sent by a computing device to a user according to the attribute of a message stored in said storage file when a user finds out said category, wherein said category is divided according to the column and the serial number in the column.

7. The method of claim 6, wherein said predetermined format in step B comprises a value of a command type, a number of messages and an identifier, lifetime, title and content of each message.

8. The method of claim 6, said complete information obtained from the short message in step C is obtained by joining at least one data short message.

9. The method of claim 6, said complete information obtained from the short message in step C is extracted from several messages which make up the data short message.

10. The method of claim 6, wherein said step C further comprises detecting the message stored in the designated storage file and deleting one message when found out of date after storing the complete information from the short message to the designated storage file.

11. The method of claim 6, wherein said step C further comprises detecting whether there is a message in the designated storage file with the same identifier as the message when the category of the message already exists in the SIM for a message in said obtained complete information.

12. The method of claim 11 further comprising removing a overdue message if there is a message in the designated storage file having the same identifier and the message has already out of date and deleting another overdue message if there is not enough storage space for said message.

13. The method of claim 11 further comprising removing an overdue message if there is not a message with the same identifier in the designated storage file, and if there is not enough storage space for said message, then a next overdue message.

14. The method claim 6, said step C further comprises detecting whether there is a message in the designated storage file with the same identifier as the message for each message in the aforesaid obtained complete information when the category of the message already exists in the SIM.

15. The method of claim 14 further comprising deleting the oldest messages one by one until the spare storage space is enough for the message if there is not a message with the same identifier in the designated storage file.

16. The method of claim 6, wherein said designated storage file doesn't occupy the storage space for common short messages in the SIM.

* * * * *

UNITED STATES PATENT AND TRADEMARK OFFICE
CERTIFICATE OF CORRECTION

PATENT NO. : 7,734,707 B2 Page 1 of 2
APPLICATION NO. : 11/915139
DATED : June 8, 2010
INVENTOR(S) : Cao et al.

It is certified that error appears in the above-identified patent and that said Letters Patent is hereby corrected as shown below:

At column 10, lines 54-64, please amend Claim 1 as follows, wherein additions are <u>underlined</u> and deletions are bolded and either stricken-through or [[surrounded by double brackets]]:
a content management device recording the content of messages and editing <u>setting</u> attributes for each recorded message; <u>and</u>
a downlink instruction sending and processing device configured to select a corresponding message from the content management message device according to a service identifier included in a service request upsent by the SUM, and construct data short messages to be sent to said SIM, with the content and attribute of the selected message and its attributes in a predetermined format; and At column 11, line 48 - column 12, line 5, please amend Claim 6 as follows, wherein additions are <u>underlined</u> and deletions are bolded and either stricken-through or [[surrounded by double brackets]]:
B) selecting a corresponding message from a recorded message sent by a computing device according to a service identifier included in a service request up-sent, and constructing data short messages sent by a computing device with the content and attributes of the selected message in a predetermined format and sending it;
C) receiving down-sent data messages and storing a complete message included in the received data message into a designated storage file at a SIM with Don't Disturb functionality;
[[d]]<u>D</u>) sending the information belong to a category sent by Signed and Sealed this Twenty-third Day of November, 2010

David J. Kappos
*Director of the United States Patent and Trademark Office*

CERTIFICATE OF CORRECTION (continued)
U.S. Pat. No. 7,734,707 B2

At column 11, lines 35 - 39, please amend Claim 13 as follows, wherein additions are <u>underlined</u> and deletions are bolded and either stricken through or [[surrounded by double brackets]]:

13. The method of claim 11 further comprising removing an overdue message if there is not a <u>no</u> message with the same identifier in the designated storage file, and if there is not enough storage space for said message, then a next overdue message.

At column 11, lines 40 - 44, please amend Claim 14 as follows, wherein additions are <u>underlined</u> and deletions are bolded and either stricken through or [[surrounded by double brackets]]:

14. The method <u>of</u> claim 6, <u>wherein</u> said step C further comprises detecting whether there is a message in the designated storage file with the same identifier as the message for each message in the aforesaid obtained complete information when the category of the message already exists in the SIM.

At column 11, lines 45 - 48, please amend Claim 15 as follows, wherein additions are <u>underlined</u> and deletions are bolded and either stricken through or [[surrounded by double brackets]]:

15. The method of claim 14 further comprising deleting the oldest messages one by one until the spare storage space is enough for the message if there is not a <u>no</u> message with the same identifier in the designated storage file.